United States Patent
Gan et al.

(10) Patent No.: US 11,727,303 B2
(45) Date of Patent: Aug. 15, 2023

(54) PRECIPITATION DETECTION USING MOBILE DEVICES

(71) Applicant: KYNDRYL, INC.

(72) Inventors: Seng Chai Gan, Ashburn, VA (US); Adam Lee Griffin, Dubuque, IA (US); Lloyd A. Treinish, Cortlandt Manor, NY (US)

(73) Assignee: KYNDRYL, INC., New York, NY (US)

( * ) Notice: Subject to any disclaimer, the term of this patent is extended or adjusted under 35 U.S.C. 154(b) by 385 days.

(21) Appl. No.: 16/547,645

(22) Filed: Aug. 22, 2019

(65) Prior Publication Data

US 2021/0056461 A1    Feb. 25, 2021

(51) Int. Cl.
*G06N 20/00*    (2019.01)
*H04W 4/33*    (2018.01)
*H04W 4/029*    (2018.01)
*G01W 1/14*    (2006.01)

(52) U.S. Cl.
CPC .............. *G06N 20/00* (2019.01); *G01W 1/14* (2013.01); *H04W 4/029* (2018.02); *H04W 4/33* (2018.02)

(58) Field of Classification Search
None
See application file for complete search history.

(56) References Cited

U.S. PATENT DOCUMENTS

| | | | |
|---|---|---|---|
| 9,326,097 B2 | 4/2016 | Sen et al. | |
| 9,332,389 B1 * | 5/2016 | De Lorenzo | .......... H04M 15/58 |
| 9,465,987 B1 * | 10/2016 | Bell | .................... G06K 9/00798 |
| 9,967,703 B1 * | 5/2018 | Ahmedin | .............. H04W 4/029 |

(Continued)

FOREIGN PATENT DOCUMENTS

| | | | | |
|---|---|---|---|---|
| CN | 104656163 B | | 4/2017 | |
| CN | 111291903 A | * | 1/2020 | ............. G01S 13/95 |

(Continued)

OTHER PUBLICATIONS

Machine Learning with partially labeled Data for Indoor Outdoor Detection, Saffar et al., 2019 16th IEEE Annual Consumer Communications & Networking Conference (CCNC).*

(Continued)

*Primary Examiner* — David J Stoltenberg
(74) *Attorney, Agent, or Firm* — Erik Swanson; Andrew M. Calderon; Calderon Safran & Cole, P.C.

(57) ABSTRACT

In an approach for precipitation detection, a processor trains a first machine learning model for detecting precipitation in a region using a first training set of data including a plurality of historical data from a plurality of mobile devices collected in the region and a plurality of quantitative precipitation estimation data. A processor trains a second machine learning model for detecting a location of a mobile device in the region using a second training set of data including both historical indoor and outdoor data from the plurality of mobile devices collected. A processor receives a current data from the mobile device. A processor determines whether the mobile device is located indoor or outdoor based on the current data. A processor compares the current data against a threshold set in the first machine learning model to indicate precipitation. A processor determines whether the current data exceeds the threshold.

20 Claims, 6 Drawing Sheets

(56) References Cited

U.S. PATENT DOCUMENTS

| | | | |
|---|---|---|---|
| 9,967,750 B1* | 5/2018 | Fernandez | H04W 12/12 |
| 10,066,987 B1* | 9/2018 | Bellamy | H04W 4/029 |
| 10,613,252 B1* | 4/2020 | Mecikalski | G01W 1/10 |
| 2014/0179298 A1* | 6/2014 | Grokop | H04W 4/029 455/418 |
| 2016/0014554 A1* | 1/2016 | Sen | H04W 4/02 455/456.2 |
| 2016/0148383 A1* | 5/2016 | Cerqueira | G01W 1/14 382/194 |
| 2016/0286627 A1* | 9/2016 | Chen | H05B 47/175 |
| 2016/0334545 A1* | 11/2016 | Varelas | H04W 4/02 |
| 2017/0075036 A1* | 3/2017 | Pikhletsky | G01R 33/091 |
| 2017/0078854 A1* | 3/2017 | Swaminathan | H04W 4/33 |
| 2018/0039891 A1* | 2/2018 | Hamann | G01W 1/10 |
| 2018/0211179 A1* | 7/2018 | Dzierwa | G06N 20/00 |
| 2018/0295598 A1* | 10/2018 | Donnellan | G01S 5/012 |
| 2018/0306609 A1* | 10/2018 | Agarwal | H04W 4/38 |
| 2018/0341041 A1* | 11/2018 | Fei | G01W 1/10 |
| 2018/0348402 A1 | 12/2018 | Elkabetz et al. | |
| 2018/0372914 A1* | 12/2018 | Yan | G06F 30/20 |
| 2019/0049626 A1* | 2/2019 | Ostrometzky | G01W 1/10 |
| 2019/0288877 A1* | 9/2019 | Babbellapati | H04L 12/66 |
| 2019/0302311 A1* | 10/2019 | Dai | G06T 17/05 |
| 2019/0325334 A1* | 10/2019 | Kuo | G06N 20/00 |
| 2019/0339416 A1* | 11/2019 | Elkabetz | G08G 5/0091 |
| 2019/0340940 A1* | 11/2019 | Elkabetz | G08G 5/0065 |
| 2020/0049856 A1* | 2/2020 | Allamano | G06T 7/194 |
| 2020/0126232 A1* | 4/2020 | Guo | G06N 3/0445 |
| 2020/0346621 A1* | 11/2020 | Whikehart | B60S 1/0833 |
| 2021/0068170 A1* | 3/2021 | Sadhu | H04W 4/023 |
| 2021/0072423 A1* | 3/2021 | Yoshikawa | G06N 20/00 |
| 2021/0116090 A1* | 4/2021 | Broers | B60S 1/0833 |
| 2021/0208307 A1* | 7/2021 | Hill | G01W 1/10 |

FOREIGN PATENT DOCUMENTS

| | | | |
|---|---|---|---|
| CN | 111983732 A * | 7/2020 | G01W 1/14 |
| WO | WO-2019126707 A1 * | 6/2019 | G01W 1/02 |

OTHER PUBLICATIONS

Short-term local weather forecast using dense weather station by deep neural network; Yonekura et al., 2018 IEEE International Conference on Big Data (Big Data).*

Exploiting Sensed Radio Strength and Precipitation for Improved Distance Estimation, Fang et al, IEEE Sensors Journal, vol. 18, No. 16, Aug. 15, 2018.*

Rainfall Estimation Based on the Intensity of the Received Signal in a LTE/4G Mobile Terminal by Using a Probabilistic Neural Network, Beritelli et al., IEEE Access, accepted May 11, 2018, date of publication May 25, 2018, date of current version Jun. 26, 2018. vol. 6, 2018.*

"Ericsson Mobility Report on the Pulse of the Networked Society", Ericsson, Jun. 2016, pp. 21-23, <https://www.ericsson.com/assets/local/mobility-report/documents/2016/Ericsson-mobility-report-june 2016.pdf>.

"How a bold innovation is enabling real-time weather data", Ericsson, Aug. 30, 2018, 2 pages, <https://www.ericsson.com/en/blog/2018/8/how-a-bold-innovation-is-enabling-real-time-weather-data>.

"On a new wavelength with weather data", Ericsson, Printed Jun. 10, 2019, 6 pages, <https://www.ericsson.com/en/cases/2018/SMHI>.

"The world's largest Open Database of Cell Towers", unwiredlabs OpenCellid, Printed Jun. 10, 2019, 3 pages, <https"//opencellid.org/#zoom=16&lat=37.77889&Ion=-122.41942>.

"Toward Locally Relevant Global Hydrological Simulations", GLOH20, <http://www.gloh2o.org/>.

"Using Commercial Microwave Links (CML) to Estimate Rainfalls: 2018 Winner", CGIAR, Platform for Big Data in Agriculture, 8 pages, <https://ibm.anaqua.com/anaqua/Invention/InventionRelatedArt.aspx?RecordId=95300409>.

Atlas et al., "Path-and area-integrated rainfall measurement by microwave attenuation in the 1-3 cm band", Journal of Applied Meterology, vol. 16, Dec. 1977, pp. 1322-1331.

Beritelli, "Rainfall Estimation Based on the Intensity of the Received Signal in a LTE/4G Mobile Terminal by Using a Probabilistic Neural Network," in IEEE Access, vol. 6, pp. 30865-30873, 2018.

Christofilakis et al., "Rainfall Measurements Due to Radio Frequency Signal Attenuation at 2 GHz", Journal of Signal and Information Processing, 2018, 9, pp. 192-201, <http://www.scirp.org/journal/jsip>.

David et al., "Analyzing the ability to reconstruct the moisture field using commercial microwave network data", Atmospheric Research, vol. 219, May 2019, 10 pages.

David et al., "Cellular Network Infrastructure the Future of Fog Monitoring?", American Meteorological Society, Oct. 2015, 12 pages, <http"//journals.ametsoc.org/dooi/abs/10.1175/BAMS-D-13-00292.1>.

David, Noam, "Harnessing Crowdsourced Data and Prevalent Technologies for Atmospheric Research", Advances in Atmospheric Sciences, vol. 36, Jul. 2019, pp. 766-769.

Doumounia et al., "Rainfall monitoring based on microwave links from cellular telecommunication networks: First results from a West African test bed", Geophysical Research Letters 41, AGU Publications, Published online Aug. 18, 2014, 7 pages, <https://agupubs.onlinelibrary.wiley.com/doi/epdf/10.1002/2014GL060724>.

Drönner et al. "Fast Cloud Segmentation Using Convolutional Neural Networks", Remote Sensing, 2018, vol. 10, 24 pages, <www.mdpi.com/journal/remotesensing>.

Gaona et al., "Measurement and interpolation uncertainties in rainfall maps from cellular communication networks", Hydrology and Earth System Sciences, Mar. 25, 2015, 14 pages, <http://www.hydrol-earth-syst-sci.net/19/3571/2015>.

Gaona et al., "Rainfall with commercial microwave links in Sao Paulo, Brazil", Atmospheric Measurement Techniques, Jul. 26, 2018, 12 pages, <https://www/atmos-meas-tech.net/11/4465/2018>.

Gosset et al., "Improving Rainfall Measurement in Gauge Poor Regions Thanks to Mobile Telecommunication Networks", American Meteorological Society, Mar. 2016, 3 pages, <http://journals.ametsoc.org/using-commercial-microwave-links-cml-to-estimate-rainfalls>.

IBM, "How analytics help Energie NB Power stay ahead of storms", The Weather Complany, an IBM Business, Printed Jun. 10, 2019, 4 pages, <https://www.ibm.com/weather>.

Igwe et al., "Received signal strength computation for broadcast services using artificial neural network," 2017 13th International Conference on Electronics, Computer and Computation (ICECCO), Abuja, 2017, pp. 1-6.

Mathake, Obakeng Caspar, Rainfall Estimation From Signal Attenuation of Cellular Phone Network (Microwave Link), Research Gate, May 2017, 19 pages, <https://www.researchgate.net/publication/323191160_Ranfall_Estimation_From_Signal_Attenuation_Of_Cellular_Phone_Networkmicrowave_link>.

Mell et al., "The NIST Definition of Cloud Computing", Recommendations of the National Institute of Standards and Technology, Special Publication 800-145, Sep. 2011, 7 pages.

Messer et al., "Environmental Monitoring by Wireless Communication Networks", Science, vol. 312, May 5, 2006, 2 pages, <www/sciencemag.org>.

Messer, Haight, "Capitalizing on Cellular Technology—Opportunities and Challenges for Near Ground Weather Monitoring", Environments, 2018, 5, 73, 12 pages, <www.mdpi.com/journal/environments>.

Overeem et al., "Country-wide rainfall maps from cellular communication networks", Proceedings of the National Academy of Sciences of the United States of America, vol. 110, No. 8, Feb. 19, 2013, 5 pages, <http://www/pnas.org/content/110/8/2741.full.pdf+html>.

Overeem et al., "Measuring urban rainfall using microwave links from commercial cellular communication networks", Water Resources

(56) References Cited

OTHER PUBLICATIONS

Research, vol. 47, W12505, 2011, 16 pages, <https://agupubs.onlinelibrary.wiley.com/doi/epdf/10.1029/2010WR010350>.

Overeem et al., "Retrieval algorithm for rainfall mapping from microwave links in a cellular communication network", Atmospheric Measurement Techniques, Aug. 7, 2015, 20 pages, <http://www/atmos-meas-tech.net/9/2425/2016>.

Overeem et al., "Two and a half years of country-wide rainfall maps using radio links from commercial cellular telecommunication networks", Water Resources Research, 52, Published Online Oct. 19, 2016, pp. 8039-8065, <https"//agupubs.onlinelibrary.wiley.com/doi/epdf/10.1002/2016WR019412>.

Pasetti et al., "Rainfall data based on Microwave links", Rainbo, Printed Jun. 10, 2019, 14 pages, <https://www/rainbolife.eu/sites/default/files/2018-03/Rainfall%20Data%20Based%20Microwave%20Links%20%28Action%20C.2%29.pdf<.

Rogers et al., "The aRb relation in the calculation of rain attenuation", . IEEE Transactions on Antennas and Propagation, Apr. 1978, 13 pages.

Sabu et al., "Effect of rainfall on cellular signal strength: a study on the variation of RSSI at user end of smartphone during rainfall," 2017 IEEE Region 10 Symposium (TENSYMP), Cochin, 2017, pp. 1-4.

Saffar et al., "Machine Learning with partially labeled Data for Indoor Outdoor Detection," 2019 16th IEEE Annual Consumer Communications & Networking Conference (CCNC), Las Vegas, NV, USA, 2019, pp. 1-8.

Smiatek et al., "Potential of commercial microwave link network derived rainfall for river runoff simulations", Environmental Research Letters, 12 (2017), 9 pages, <http://iopscience io[.org/article/10.1088/1748-9326/aa5f46>.

Tollefson, Jeff, "Mobile-Phone Signals Bolster Street-Level Rain Forecasts", Scientific American, Apr. 10, 2017, 10 pages, <https://www.scientificamerican.com/article/mobile-phone-signals-bolster-street-level-rain-forecasts1>.

Tromel et al., "Using Microwave Backhaul Links to Optimize the Performance of Algorithms for Rainfall Estimation and Attenuation Correction", Journal of Atmospheric and Oceanic Technology, vol. 31, Aug. 2014, 13 pages, <https://journals.ametsoc.org/doi/10.1175/JTECH-D-14-00016.1>.

Uijlenhoet et al., Opportunistic remote sensing of rainfall using microwave links from cellular communication networks:, Wiley WIREs Water, 2018, 15 pages, <https://onlinelibrary.wiley.com/doi/pdf/10.1002/wat2.1289>.

Zhang et al., "WiHumidity: a Novel CSI-Based Humidity Measurement System." In: Qiu M. (eds) Smart Computing and Communication. SmartCom 2016. Lecture Notes in Computer Science, vol. 10135. Springer, pp. 537-547, 2017.

Unknown, "It's Time for Microweather", https://www.climacell.co/, downloaded Jul. 19, 2022, 5 pages.

* cited by examiner

PRECIPITATION DETECTION USING MOBILE DEVICES

BACKGROUND

The present disclosure relates generally to the field of precipitation detection, and more particularly to detecting precipitation information leveraging data from mobile devices.

Quantitative precipitation estimation is a method of approximating the amount of precipitation that has fallen at a location or across a region. Maps of the estimated amount of precipitation to have fallen over a certain area and time span are compiled using several different data sources including manual and automatic field observations and radar and satellite data.

SUMMARY

Aspects of an embodiment of the present disclosure disclose an approach for precipitation detection. A processor trains a machine learning model for detecting precipitation in a region using a training set of data including a plurality of historical data from a plurality of mobile devices collected in the region and a plurality of quantitative precipitation estimation data in the region. A processor trains a second machine learning model for detecting a location of a mobile device in the region using a second training set of data including both historical indoor and outdoor data collected in the region from the plurality of mobile devices. A processor receives current data from the mobile device. A processor determines whether the mobile device is located indoor or outdoor based on the current data by using the second machine learning model. A processor, in response to determining the mobile device being outdoor, compares the current data against a threshold set in the first machine learning model to indicate precipitation. A processor determines whether the current data from the mobile device exceeds the threshold. A processor, in response to determining the current data from the mobile device exceeding the threshold, indicates precipitation is detected.

DETAILED DESCRIPTION

Figure 1:
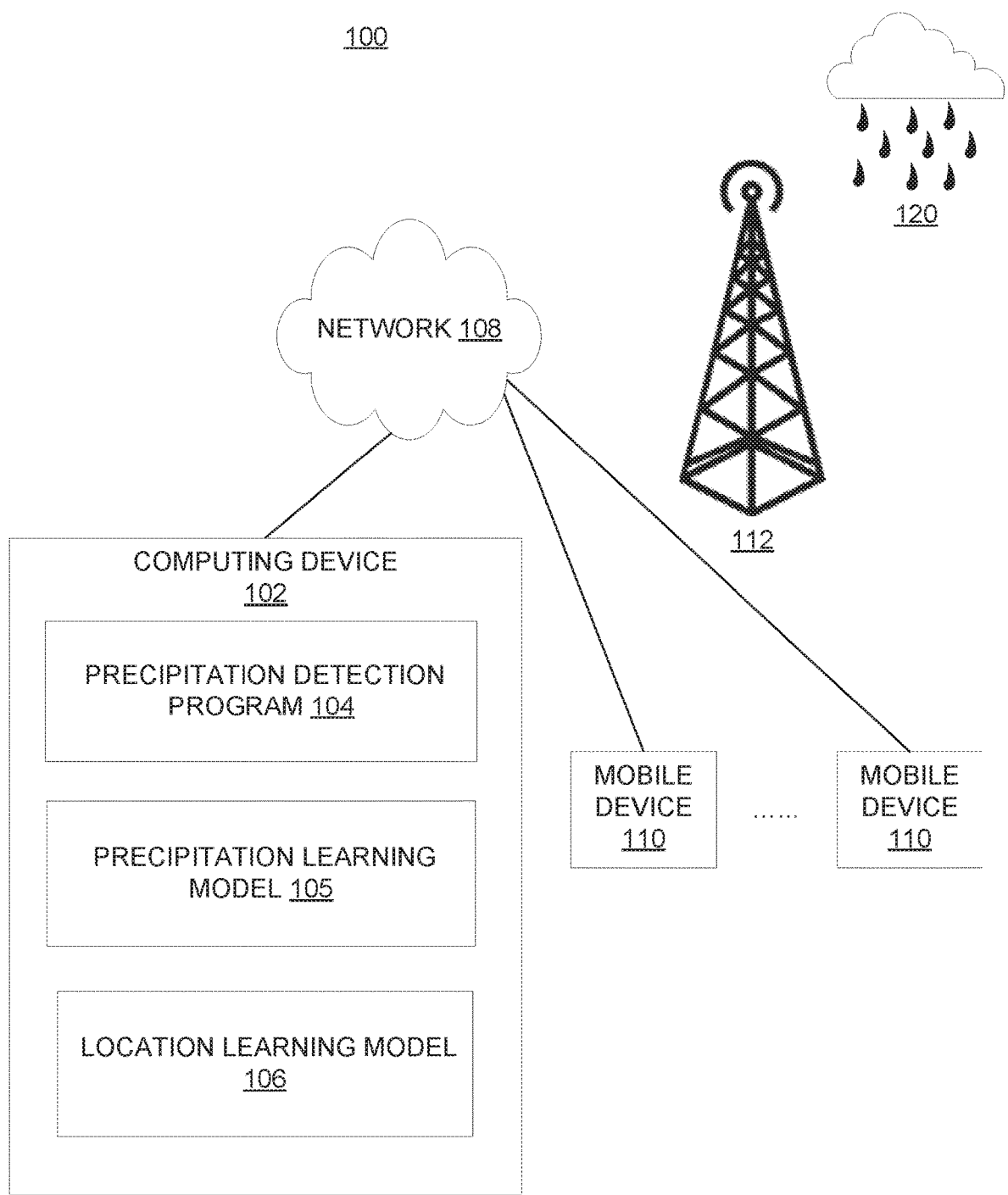
FIG. 1 is a functional block diagram illustrating a precipitation detection environment, in accordance with an embodiment of the present disclosure.

The present disclosure is directed to systems and methods for detecting precipitation leveraging data from mobile devices (e.g., cellular telephones) and their communication systems.

For many parts the world, especially in developing economies, high-quality estimates of precipitation ("Quantitative Precipitation Estimates" or QPE) are not available. Typically, this situation is due to limited deployment of instrumentation such as rain gauges and weather radar. In some areas, there may also be a lack of communication and computing infrastructure to collect and manage such data. In additional instances, instrumentation and infrastructure may exist, but due to national government policies, the data are not made available, either openly or by licensing. While weather modelling can be used to fill in such gaps in coverage, reliable, local observations are still needed to calibrate and validate the output of such models. Data from microwave sensors in earth's orbit can also be used to fill these gaps, but the information is coarse compared to the scale of clouds. In addition, such remotely sensed data are often not available in near-real-time. Hence, such data are of limited use to decision makers needing reliable and precise precipitation estimates. For some countries, there is a significant deployment of wireless communications systems used by both the public and businesses in regions where there are few, reliable weather stations and limited coverage with radar.

This present disclosure discloses a method of using a common cellular telephone to detect rain in those areas that lack conventional precipitation sensors but does have cellular infrastructure and network coverage.

This present disclosure recognizes that the notion of estimating precipitation from cellular telephone signals has focused on the attenuation of the signals between cellular telephone communication towers, given that they are at fixed locations and the assumption that the tower operators themselves have control of the signal strength, and have access to data associated with those signals. That signal strength may also be adjusted to compensate for precipitation. Having information about the power of the signal under dry, wet and other weather conditions can enable one to derive information about moisture in the atmosphere as well as precipitation. This invention disclosure recognizes that the same phenomenon explains why satellite-based television or radio can be disrupted during severe storms or how global positioning system (GPS) signals provide information about the vertical structure of moisture in the atmosphere. The information that can be extracted is limited to line-of-sight between towers and surrounding areas. This invention disclosure recognizes the limitation of the availability of the proprietary data associated with the transmission and reception in sufficient volume and in real-time. For many regions, the signal strength data are not available from the tower operators. Given the variation in the communications bands that the network operations use, there is variability with how relevant some systems may be. Information from the line of sight between towers needs to be accurately interpolated to regions in between in order to provide useful weather information. This can be problematic in regions where the density of towers is limited. Hence, the interpolation of signal strength data on the line-of-sight link to conventional maps may introduce errors in the QPEs. If there is dust or other particulates in the atmosphere along the line of sites, discrimination of the source of attenuation with moisture can be difficult. When the atmosphere is relatively saturated near the towers (i.e., high humidity), false positive derivations of precipitation are possible. Accurate retrieval of precipitation is also more difficult when there is frozen precipitation along the line of sight between the towers.

The present disclosure discloses a method to extract precipitation information leveraging data from cellular telephones and their wireless communication systems that is more robust than the aforementioned method with additional flexibility. It can leverage data derived from both cellular and WiFi communication networks. It can be further enhanced, if signal strength data between cellular towers are also available. The approach includes the applications of machine learning models, which would utilize both near-real-time and historical data.

Given the use of alternative data (signals between the mobile phone and the cellular tower and or WiFi access point, and directly from the mobile phone), the constraint of data availability of the cellular tower operators can be minimized. It should be noted that many cellular telephone network operators contract other companies for the use of cellular towers and do not have access to information from that component of the communications network. More specifically, the present disclosure discloses using cellular received signal strength and cellular tower identification of outdoor cellular telephones to detect rainfall. The present disclosure also discloses using machine learning methods to train and set thresholds for detection of the location of the cellular telephone (indoor versus outdoor) based on either user input or images from the cellular telephone's digital camera. The present disclosure further discloses using machine learning methods to train and set thresholds for detection of rainfall from outdoor cellular telephones based solely on received strength data.

The initial application of this disclosure may provide near-real-time access to current weather conditions throughout the globe. For the specific location(s) of interest, nearby weather measurements are analyzed to provide the best estimates. Gaps in measurements are addressed by data from weather models. As discussed earlier, in many parts of the world, such measurements are simply not available. As a result, the quality of the information about current weather conditions, especially precipitation, could be quite poor. The methods discussed in this disclosure would enable more accurate information to be available, especially in data-poor areas. This improved information is of direct use for both consumer (e.g., via mobile and web interfaces) and business applications, including aviation, broadcast television, energy utilities, agriculture and others, especially in the developing economies. In addition, such data can be used to validate and improve forecast models.

The present disclosure discloses that a set of data from each cellular telephone will be collected in a region that has a rich collection of conventional precipitation observations (i.e., Quantitative Precipitation Estimates, QPE, derived from rain gauges, radar, photographs, anecdotal reports and remote sensing from earth's orbit). Both sets of data will be used to create a training set for a machine learning model, which will map the data from cellular telephones to various characteristics of the precipitation, including periods of no precipitation, and the region where the precipitation occurs and the season when the precipitation occurs. A mixture of machine learning techniques will be applied, including decision tree methods like Random Forest and deep learning methods like Convolutional Neural Networks. The machine learning model may be applied to regions where only the data from cellular telephones are available to provide QPEs. It should be noted that if the requirements for the fidelity of the QPEs are reduced (e.g., is it raining or not), then the quality of the machine-learned calibration may be less critical.

The data required from the cellular telephones may include the following examples. A cellular tower transmits a test signal at intervals of no more than one second to the cellular telephone as part of normal operations. Rain start and stop times may be estimated at intervals much greater than one second. For typical applications, this can be one to five minutes. Hence, there may be, for example, over 100 samples for each rainfall interval to be determined. The pattern of received strength data (rain and without rain) may be trained using learning with both automated and manual data derived from each cellular telephone such as temperature, humidity, pressure and location. A user may report whether it is raining at the user's location as further input data. Photographs from the cellular telephone camera with a line-of-sight view of the cellular tower may be provided as an input data as well.

According to one embodiment of the present disclosure, only received signals from a cellular telephone outside of a building or a car could be used in training to establish initial baselines. A cellular telephone inside a building and/or a car will have a lowered received signal strength range that influences overall attenuation analysis. The present disclosure discloses using a machine learning algorithm to detect and set the indoor received signal strength range and location awareness to omit deviations and or undesired data points. In addition, any cellular telephone with rapidly changing locations or in accelerating motion (e.g., inside a car) up to certain speed may be ignored as well. Further, location information can be used in conjunction with geographic and or location beacon network information systems to detect whether the cellular telephone is indoor or outdoor. Lower pressure levels indicative of higher altitude can be used to discriminate being indoors (i.e., in a tall building).

Cellular tower identification reported by a cellular telephone may be used to detect the cellular tower location information and height of the transmitting antenna as well. Temperature and humidity data can be collected and used to model the attenuation caused by rain along with pressure, which can be correlated with conditions that can lead to rain events. Image classification methods may be used to detect rainfall in the photographs from the cellular telephones as well as the portion of the training set that may include image representations of precipitation from weather radar.

The present disclosure will now be described in detail with reference to the Figures. FIG. 1 is a functional block diagram illustrating a precipitation detection environment, generally designated 100, in accordance with an embodiment of the present disclosure.

In the depicted embodiment, precipitation detection environment 100 includes computing device 102, network 108, mobile devices 110, and cellular tower 112. Precipitation detection environment 100 may also include rainfall 120. In general, cellular tower 112 is a cellular-enabled mobile device site where antennae and electronic communications equipment are placed—typically on a radio mast, tower, or other raised structure—to create a cell in a cellular network. A cellular network is a network of handheld mobile phones in which each phone communicates with the telephone network by radio waves in the microwave portion of the electromagnetic spectrum through a local antenna at a cellular tower.

In various embodiments of the present disclosure, mobile device 110 can be a laptop computer, a tablet computer, or a netbook computer. In another embodiment, mobile device 110 is a cellular telephone, a mobile phone, a smart phone, a smart watch, a wearable computing device, or a personal digital assistant. In general, mobile device 110 can be any electronic device or computing system capable of wirelessly communicating with cellular tower 112 and being accessed through a communication network such as network 108, in accordance with an embodiment of the present disclosure. Mobile device 110 may include internal and external hardware components, as depicted and described in further detail with respect to FIG. 4.

In various embodiments of the present disclosure, computing device 102 can be a laptop computer, a tablet computer, a netbook computer, a personal computer, a desktop computer, a mobile phone, a smartphone, a smart watch, a wearable computing device, a personal digital assistant, or a server. In another embodiment, computing device 102 represents a computing system utilizing clustered computers and components to act as a single pool of seamless resources. In other embodiments, computing device 102 may represent a server computing system utilizing multiple computers as a server system, such as in a cloud computing environment or a high-performance computing cluster. In general, computing device 102 can be any computing device or a combination of devices with access to precipitation detection program 104, precipitation learning model 105, location learning model 106, and network 108 and is capable of processing program instructions and executing precipitation detection program 104, precipitation learning model 105, and location learning model 106, in accordance with an embodiment of the present disclosure. Computing device 102 may include internal and external hardware components, as depicted and described in further detail with respect to FIG. 4.

Further, in the depicted embodiment, computing device 102 includes precipitation detection program 104, precipitation learning model 105, and location learning model 106. In the depicted embodiment, precipitation detection program 104, precipitation learning model 105, and location learning model 106 are located on computing device 102. However, in other embodiments, precipitation detection program 104, precipitation learning model 105, and location learning model 106 can be located on mobile device 110. In another embodiment, precipitation detection program 104, precipitation learning model 105, and location learning model 106 may be located externally and accessed through a communication network such as network 108. The communication network can be, for example, a local area network, a wide area network such as the Internet, or a combination of the two, and may include wired, wireless, fiber optic or any other connection known in the art. In general, the communication network can be any combination of connections and protocols that will support communications among computing device 102, precipitation detection program 104, precipitation learning model 105, and location learning model 106, in accordance with a desired embodiment of the disclosure.

Precipitation detection program 104 receives and extracts precipitation information leveraging data from mobiles devices 110 and their communications systems such as cellular tower 112. Precipitation detection program 104 can leverage data derived from both cellular and WiFi communications networks. Precipitation detection program 104 further enhances data when signal strength data between cellular towers 112 are also available. Precipitation detection program 104 includes the applications of machine learning models, which utilize both near-real-time and historical data. In an example, precipitation detection program 104 may use cellular received signal strength and cellular tower identification of outdoor mobile devices 110 to detect rainfall 120. Precipitation detection program 104 may use a machine learning method to train and set thresholds for detection of the location of the mobile device (indoor versus outdoor) based on either user input or images from the mobile device's camera. Precipitation detection program 104 may use a machine learning method to train and set thresholds for detection of rain from outdoor mobile devices 110 based solely on received strength data.

Precipitation detection program 104 is configured to train precipitation learning model 105 and location learning model 106. Precipitation detection program 104 trains precipitation learning model 105 for detecting precipitation in a region using a training set of data including a plurality of data from mobile devices 110 collected in the region and a plurality of quantitative precipitation estimation data in the region. Precipitation learning model 105 can utilize both near-real-time and historical data collected from mobile devices 110 and quantitative precipitation estimates in the region. In an example, a set of data from each mobile device 110 can be collected in a region that has a rich collection of conventional precipitation observations i.e., QPEs derived from rain gauges, radar, photographs, anecdotal reports and remote sensing from orbit. Both sets of data from mobile devices 110 and quantitative precipitation estimation data are used to create a training set for precipitation learning model 105, which maps the data from mobile devices 110 to various characteristics of the precipitation, including periods of no precipitation, the region where the precipitation occurs, and the season when the precipitation occurs. Precipitation detection program 104 can use a mixture of machine learning techniques including decision tree methods like Random Forest and deep learning methods like Convolutional Neural Networks. Precipitation learning model 105 can be applied to regions where the data from mobile devices 110 are available to provide QPEs.

In an example, the data from mobile devices 110 may include data of temperature, humidity, pressure, location, reports about whether it is raining at the user's location, and photographs from mobile device cameras with a line-of-sight view of cellular tower 112. In an example, a normal operation between cellular tower 112 and mobile devices 110 can be when a signal transmitted and received from cellular tower 112 is at interval of, for example, no more than one second to mobile devices 110. During raining, intervals can be much greater due to precipitation interruption. The received strength data and pattern (rain and without rain) can be trained accordingly using learning both automated and manual data derived from each mobile device 110 including data of temperature, humidity, pressure, location, reports about whether it is raining at the user's location, and photographs from mobile device cameras with a line-of-sight view of cellular tower 112.

Precipitation detection program 104 is configured to use the data from cellular telephones (e.g., received signals from cellular tower 112) from mobile devices 110 outside a building or a car in training to establish initial baselines. A mobile device inside a building and/or a car has a lowered received signal strength range that influences overall attenuation analysis. Precipitation detection program 104 is configured to train location learning model 106 for detecting whether mobile devices 110 are located indoor or outdoor in the region using both indoor and outdoor data from mobile devices 110 collected in the region. Location learning model 106 may detect and set the indoor received signal strength range and location awareness to omit deviations and or undesired data points. Data from mobile device 110 with rapidly changing locations or in accelerating motion (e.g., inside a car) up to certain speed will be ignored as well. Precipitation detection program 104 may use location information in conjunction with geographic and or location beacon network information systems to detect whether mobile device 110 is indoor or outdoor. Lower pressure levels indicative of higher altitude can be used to discriminate being indoors (i.e., in a tall building).

In some examples, precipitation detection program 104 may use identification of cellular tower 112 reported by mobile devices 110 to detect the location information and height of the transmitting antenna of cellular tower 112. Precipitation detection program 104 may use data of temperature and humidity to model the attenuation caused by rainfall 120 along with pressure, which can be correlated with conditions that can lead to rainfall 120. Precipitation detection program 104 may use image classification methods such as convolutional neural networks to detect rainfall 120 in the photographs from mobile devices 110 as well as the portion of the training set that would include image representations of precipitation from weather radar.

Figure 2:
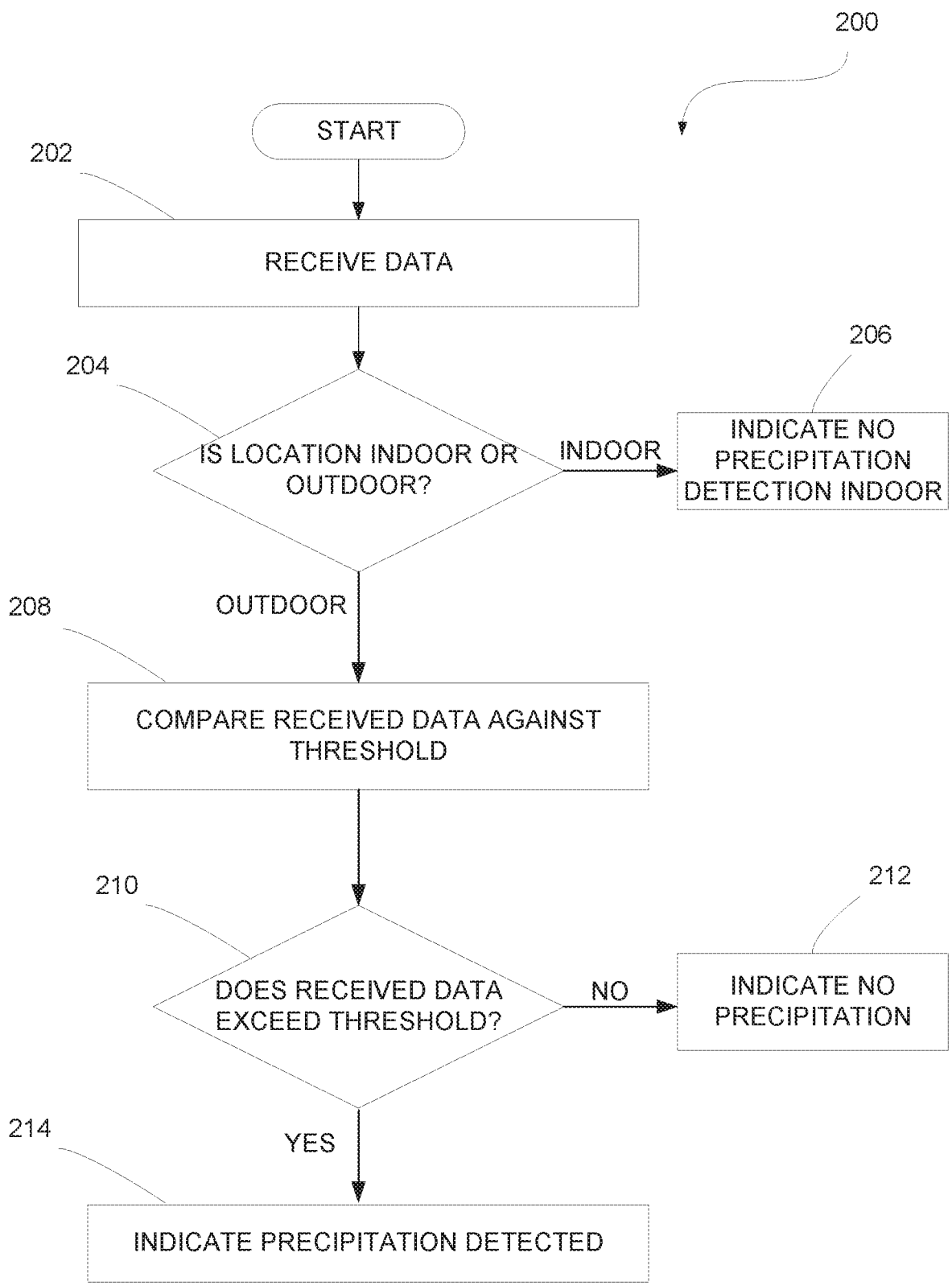
FIG. 2 is a flowchart depicting operational steps of a precipitation detection program within a computing device of FIG. 1, in accordance with an embodiment of the present disclosure.

FIG. 2 is flowchart 200 depicting operational steps of precipitation detection program 104 in accordance with an embodiment of the present disclosure.

Precipitation detection program 104 operates to receive data from cellular telephones from mobile device 110. The data from cellular telephones may include data of temperature, humidity, pressure, location of the mobile device, received cellular signal strength and frequency, and cellular tower identification for mobile device 110. Precipitation detection program 104 also operates to determine whether the location of mobile device 110 is indoor or outdoor based on the current data from mobile devices 110 by using location learning model 106. Precipitation detection program 104 uses the data (e.g., received signals from cellular tower 112) from mobile devices 110 outside a building or a car in training to establish initial baselines. If it is determined that mobile device 110 is located indoor, precipitation detection program 104 operates to indicate no precipitation detection indoor. If it is determined that mobile device 110 is located outdoor, precipitation detection program 104 operates to compare the received data again a threshold set in precipitation learning model 105 to indicate precipitation. Precipitation detection program 104 operates to determine whether the received data from mobile device 110 exceeds a threshold set in precipitation learning model 106 to indicate precipitation. If it is determined that the received data from mobile device 110 does not exceed a threshold, precipitation detection program 104 operates to indicate no precipitation. If it is determined that the received data from mobile device 110 exceeds a threshold set in precipitation learning model 106, precipitation detection program 104 operates to indicate precipitation detected.

In step 202, precipitation detection program 104 receives data from mobile device 110. The data from mobile devices 110 may include data of temperature, humidity, pressure, location of the mobile device, received cellular signal strength and frequency, and cellular tower identification for mobile device 110. Precipitation detection program 104 receives and extracts precipitation information leveraging data from mobiles devices 110 and their communications systems such as cellular tower 112. Precipitation detection program 104 can leverage data derived from both cellular and WiFi communications networks. Precipitation detection program 104 further enhances data when signal strength data between cellular towers 112 are also available. Precipitation detection program 104 includes the applications of machine learning models, which utilize both near-real-time and historical data. In an example, precipitation detection program 104 may use cellular received signal strength and cellular tower identification of outdoor mobile devices 110 to detect rainfall 120. Precipitation detection program 104 may use a machine learning method to train and set thresholds for detection of the location of the mobile device (indoor versus outdoor) based on either user input or images from the mobile device's camera. Precipitation detection program 104 may use a machine learning method to train and set thresholds for detection of rain from outdoor mobile devices 110 based solely on received strength data.

Precipitation detection program 104 trains precipitation learning model 105 for detecting precipitation in a region using a training set of data including a plurality of data from mobile devices 110 collected in the region and a plurality of quantitative precipitation estimation data in the region. Precipitation learning model 105 can utilize both near-real-time and historical data collected from mobile devices 110 and quantitative precipitation estimates in the region. In an example, a set of data from each mobile device 110 can be collected in a region that has a rich collection of conventional precipitation observations i.e., QPEs derived from rain gauges, radar, photographs, anecdotal reports and remote sensing from orbit. Both sets of data from mobile devices 110 and quantitative precipitation estimation data are used to create a training set for precipitation learning model 105, which maps the data from mobile devices 110 to various characteristics of the precipitation, including periods of no precipitation, the region where the precipitation occurs, and the season when the precipitation occurs. Precipitation detection program 104 can use a mixture of machine learning techniques including decision tree methods like Random Forest and deep learning methods like Convolutional Neural Networks. Precipitation learning model 105 can be applied to regions where the data from mobile devices 110 are available to provide QPEs.

In step 204, precipitation detection program 104 determines whether the location of mobile device 110 is indoor or outdoor based on the current data from mobile devices 110 by using location learning model 106. Precipitation detection program 104 uses the data (e.g., received signals from cellular tower 112) from mobile devices 110 outside a building or a car in training to establish initial baselines. A mobile device inside a building and/or a car has a lowered received signal strength range that influences overall attenuation analysis. Precipitation detection program 104 is configured to train location learning model 106 for detecting whether mobile devices 110 are located indoor or outdoor in the region using both indoor and outdoor data from mobile devices 110 collected in the region. Location learning model 106 may detect and set the indoor received signal strength range and location awareness to omit deviations and or undesired data points. Data from mobile device 110 with rapidly changing locations or in accelerating motion (e.g., inside a car) up to certain speed will be ignored as well. Precipitation detection program 104 may use location information in conjunction with geographic and or location beacon network information systems to detect whether mobile device 110 is indoor or outdoor. Lower pressure levels indicative of higher altitude can be used to discriminate being indoors (i.e., in a tall building).

If it is determined that mobile device 110 is located indoor, precipitation detection program 104 indicates no precipitation detection indoor in step 206. If it is determined that mobile device is located outdoor, precipitation detection program 104 compares the received data again a threshold set in precipitation learning model 105 to indicate precipitation in step 208. In step 210, precipitation detection program 104 determines whether the received data from mobile device 110 exceeds a threshold set in precipitation learning model 106 to indicate precipitation. If it is determined that the received data from mobile device 110 does not exceed a threshold set in precipitation learning model 106 to indicate precipitation, precipitation detection program 104 indicates no precipitation in step 212. If it is determined that the received data from mobile device 110 exceeds a threshold set in precipitation learning model 106 to indicate precipitation, precipitation detection program 104 indicates precipitation detected in step 214.

Figure 3:
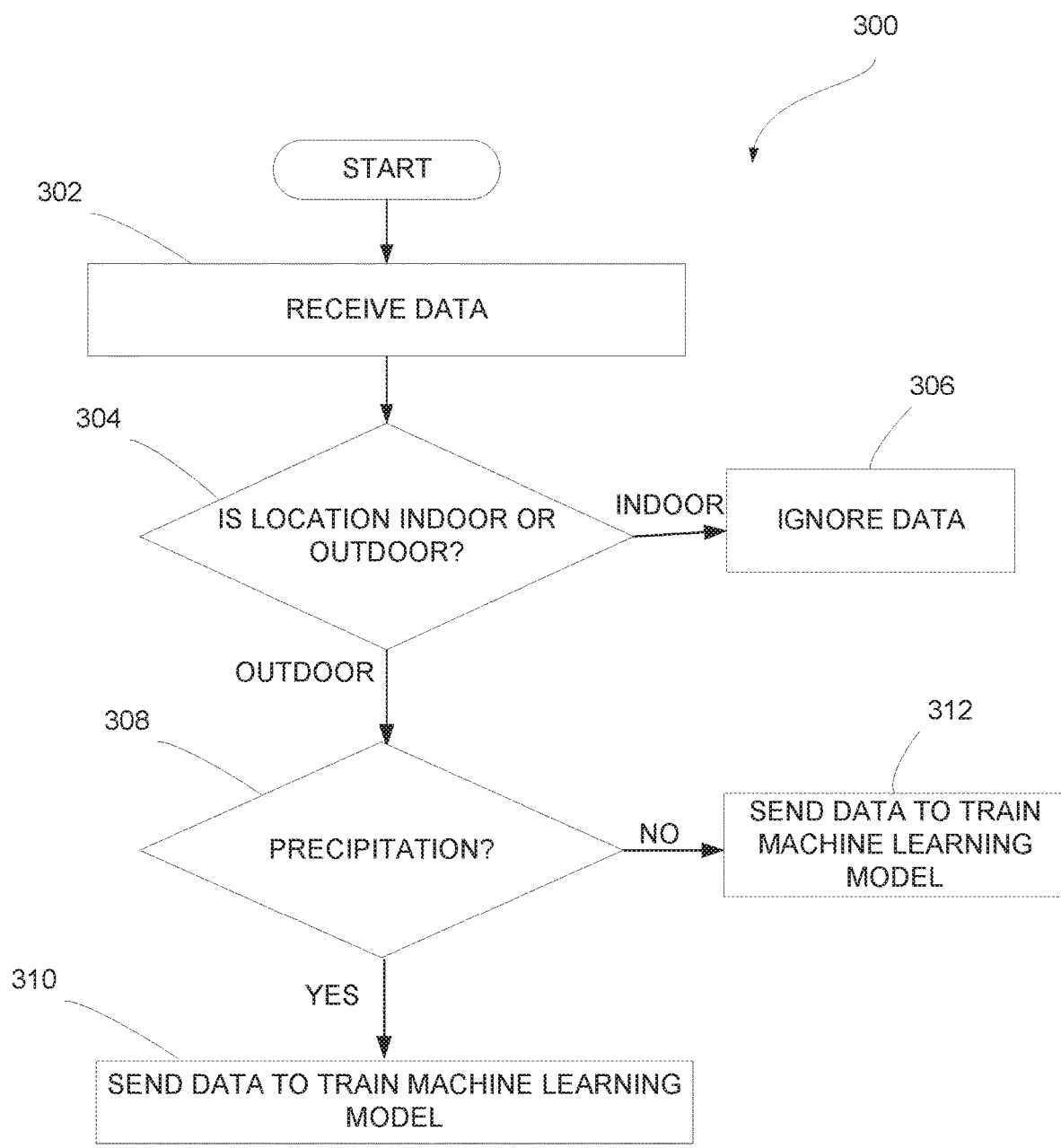
FIG. 3 is a flowchart depicting operational steps of the precipitation detection program to train a precipitation learning model and a location learning model included in the computing device of FIG. 1, in accordance with an embodiment of the present disclosure.

FIG. 3 is flowchart 300 depicting operational steps of precipitation detection program 104 to train precipitation learning model 105 and location learning model 106 in accordance with an embodiment of the present disclosure.

Precipitation detection program 104 operates to receive data from mobile device 110. Precipitation detection program 104 also operates to determine whether the location of mobile device 110 is indoor or outdoor based on the current data from mobile device 110 by using location learning model 106. Regardless whether precipitation occurs, precipitation detection program 104 sends the data from mobile device 110 as an input to dynamically train and update precipitation learning model 105 in a near-real-time.

In step 302, precipitation detection program 104 receives data from mobile device 110. The data from mobile devices may include data of temperature, humidity, pressure, location of the mobile device, received cellular signal strength and frequency, and cellular tower identification for the mobile device. In step 304, precipitation detection program 104 determines whether the location of mobile device 110 is indoor or outdoor based on the current data from mobile device 110 by using location learning model 106. If it is determined that mobile device 110 is located indoor, precipitation detection program 104 ignores data for training precipitation learning model 105 in step 206. If it is determined that mobile device 110 is located outdoor, precipitation detection program 104 determines whether precipitation occurs in step 308. Regardless whether precipitation occurs, in steps 310 and 312, precipitation detection program 104 sends the data from mobile device 110 as an input to dynamically train and update precipitation learning model 105 in a near-real time.

Figure 4:
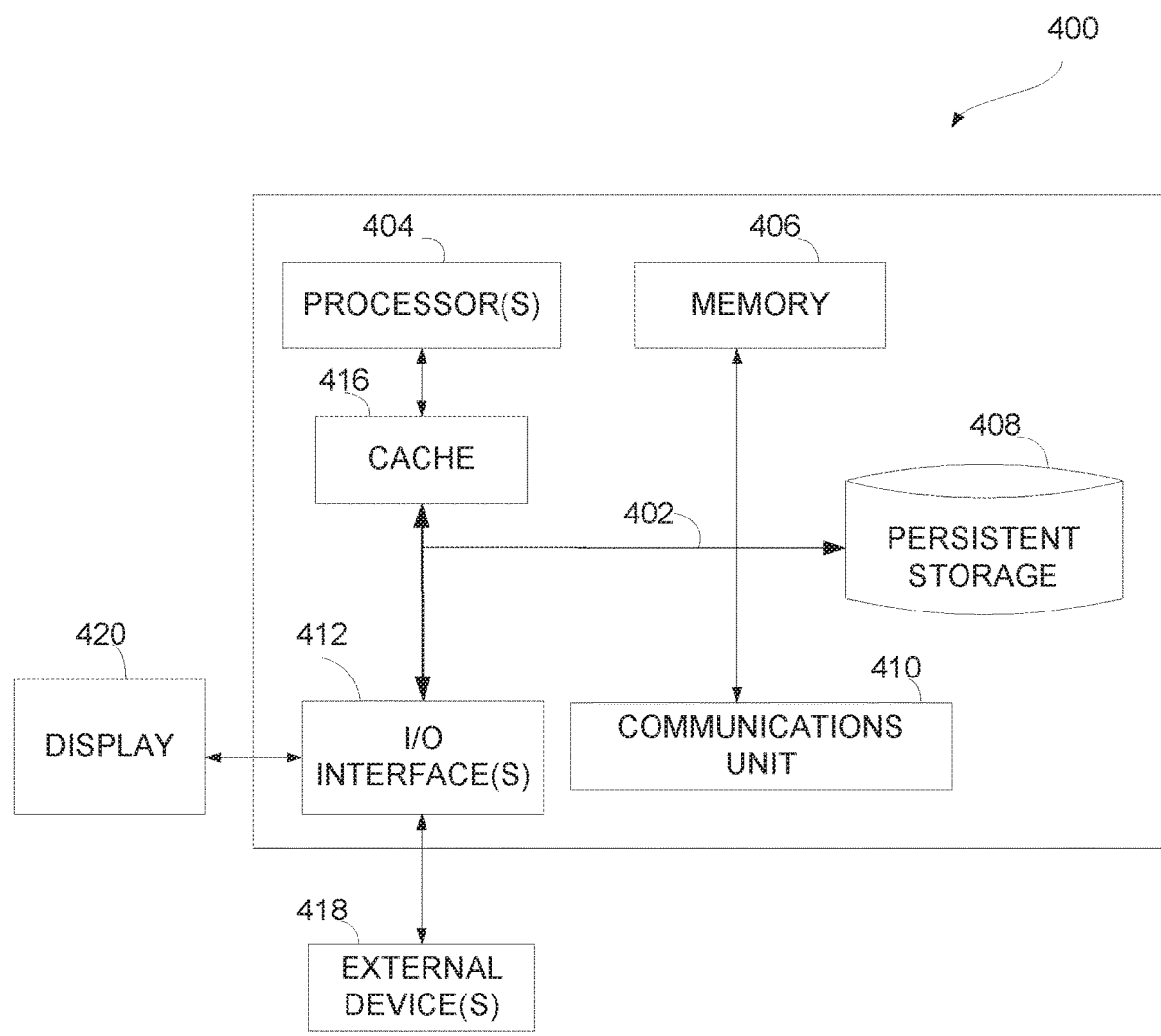
FIG. 4 is a block diagram of components of the computing device and the mobile devices of FIG. 1, in accordance with an embodiment of the present disclosure.

FIG. 4 depicts a block diagram 400 of components of computing device 102, and mobile devices 110 in accordance with an illustrative embodiment of the present disclosure. It should be appreciated that FIG. 4 provides only an illustration of one implementation and does not imply any limitations with regard to the environments in which different embodiments may be implemented. Many modifications to the depicted environment may be made.

Computing device 102, and mobile devices 110 each may include communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Precipitation detection program 104, precipitation learning model 105, and location learning model 106 each may be stored in persistent storage 408 and in memory 406 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, portable flash memory drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both wired and wireless communications links. Precipitation detection program 104, precipitation learning model 105, and location learning model 106 each may be downloaded to persistent storage 408 through communications unit 410.

I/O interface(s) 412 allows for input and output of data with other devices that may be connected to computing device 102, and/or mobile devices 110. For example, I/O interface 412 may provide a connection to external devices 418 such as a keyboard, keypad, a touch screen, and/or some other suitable input device. External devices 418 can also include portable computer readable storage media such as, for example, portable flash memory drives, portable optical or magnetic disks, and memory cards. Software and data used to practice embodiments of the present invention, e.g., precipitation detection program 104, precipitation learning model 105, and location learning model 106 can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, graphics processing units (GPU), field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
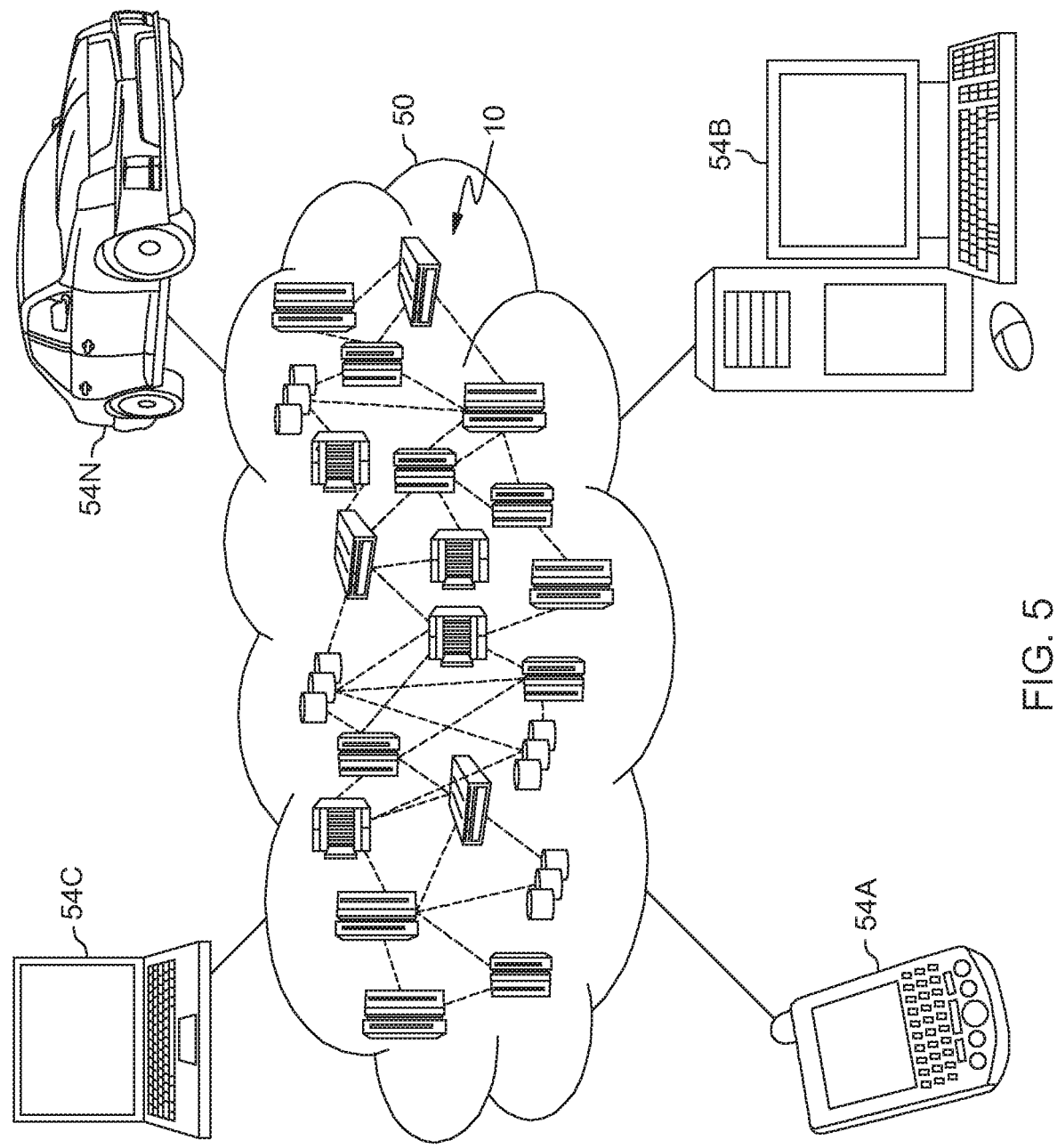
FIG. 5 depicts an embodiment of a cloud computing environment in accordance with the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
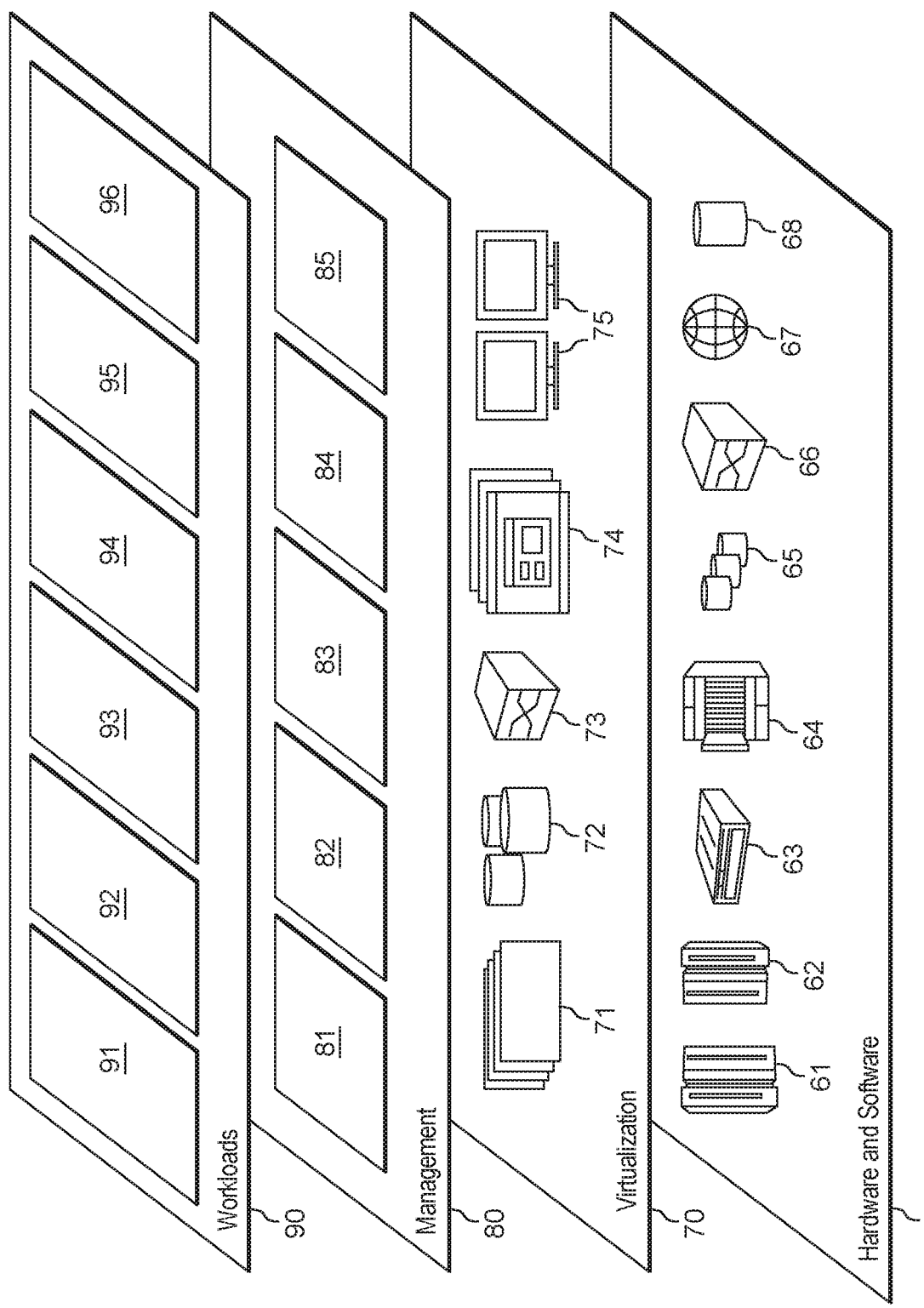
FIG. 6 depicts an embodiment of abstraction model layers of a cloud computing environment, in accordance with the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and module 96 including, for example, precipitation detection program 104, precipitation learning model 105, and location learning model 106 as described above with respect to precipitation detection environment 100.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method comprising:
    training, by one or more processors, of a first machine learning model for detecting precipitation in a region using a first training set of data including a plurality of historical data collected from a plurality of mobile devices collected in the region and a plurality of quantitative precipitation estimation data in the region, the first machine learning model being trained by mapping the historical data collected from the plurality of mobile devices to the quantitative precipitation estimation data;
    training, by the one or more processors, of a second machine learning model for detecting a location of a mobile device in the region using a second training set of data including both historical indoor and outdoor data from the plurality of mobile devices collected in the region, the historical indoor and outdoor data including an indoor received signal strength range and location awareness utilized in omitting deviations in a current data received from the mobile device;
    setting, by the one or more processors using the second machine learning model, a first threshold utilized in detecting the location of the mobile device,
    receiving, by the one or more processors, the current data;
    determining, by the one or more processors, whether the mobile device is located indoor or outdoor based on the current data by using the second machine learning model;
    training, by the one or more processors, the first machine learning model with only mobile devices determined to be outside of a building or a car to establish initial baselines to detect precipitation in the region;
    in response to determining the mobile device being outdoor, comparing, by the one or more processors, the current data against a second threshold set in the first machine learning model trained with only the mobile devices determined to be outside to indicate precipitation;
    determining, by the one or more processors, whether the current data from the mobile device exceeds the second threshold; and
    in response to determining the current data from the mobile device exceeding the second threshold, indicating, by the one or more processors, precipitation is detected.

2. The computer-implemented method of claim 1, wherein the plurality of historical data from the plurality of mobile devices includes data of temperature, humidity, pressure, location, reports about whether it is raining at the user's location, and photographs from a mobile device camera with a line-of-sight view of a cellular tower, and further comprising:
    detecting precipitation from the photographs from the mobile device camera by utilizing image classification methods.

3. The computer-implemented method of claim 1, wherein the plurality of quantitative precipitation estimation data is derived from rain gauges, radar, photographs, anecdotal reports and remote sensing from orbit.

4. The computer-implemented method of claim 1, wherein the first machine learning model is trained to map a cellular signal data to characteristics of the precipitation, the characteristics including periods of no precipitation, the region where the precipitation occurs, and a season when the precipitation occurs.

5. The computer-implemented method of claim 4, further comprising:
    in response to determining the mobile device being outdoor, sending, by the one or more processors, the cellular signal data as an input to train the first machine learning model, the cellular signal data including at least cellular received signal strength data.

6. The computer-implemented method of claim 4, wherein the cellular signal data includes cellular received signal strength and a cellular tower identification of the mobile device, the cellular received signal strength is collected through test signals sent at predetermined time intervals from a cellular tower identified by the cellular tower identification to the mobile device, and the cellular tower identification is used to detect a height of a transmitting antenna.

7. The computer-implemented method of claim 1, wherein the first machine learning model is configured to use a mixture of machine learning techniques including a decision tree method and a deep learning method.

8. A computer program product comprising:
one or more computer readable storage media and program instructions stored on the one or more computer readable storage media, the program instructions comprising:
program instructions to train a first machine learning model for detecting precipitation in a region using a first training set of data including a plurality of historical data collected from a plurality of mobile devices collected in the region and a plurality of quantitative precipitation estimation data in the region, the first machine learning model being trained by mapping the historical data collected from the plurality of mobile devices to the quantitative precipitation estimation data, and the historical data including a cellular received signal strength of the mobile device;
program instructions to train a second machine learning model for detecting a location of a mobile device in the region using a second training set of data including both historical indoor and outdoor data from the plurality of mobile devices collected in the region, the historical indoor and outdoor data including an indoor received signal strength range and location awareness utilized in omitting deviations in a current data received from the mobile device;
program instructions to set, using the second machine learning model, a first threshold to detect the location of the mobile device,
program instructions to receive the current data;
program instructions to determine whether the mobile device is located indoor or outdoor based on the current data by using the second machine learning model;
program instructions to train the first machine learning model with only mobile devices determined to be outside of a building or a car and update the first machine learning model with the historical data collected from the mobile devices determined to be outside;
program instructions to, in response to determining the mobile device being outdoor, compare the current data against a second threshold set in the first machine learning model trained with only the mobile devices determined to be outside to indicate precipitation;
program instructions to determine whether the current data from the mobile device exceeds the second threshold; and
program instructions to, in response to determining the current data from the mobile device exceeding the second threshold, indicate precipitation is detected.

9. The computer program product of claim 8, wherein the plurality of historical data from the plurality of mobile devices includes data of temperature, humidity, pressure, location, reports about whether it is raining at the user's location, and photographs from a mobile device camera with a line-of-sight view of a cellular tower, the program instructions further comprising:
program instructions to determine precipitation from the photographs from the mobile device camera by utilizing image classification methods.

10. The computer program product of claim 8, wherein the plurality of quantitative precipitation estimation data is derived from rain gauges, radar, photographs, anecdotal reports and remote sensing from orbit.

11. The computer program product of claim 8, wherein the first machine learning model is trained to map a cellular signal data to characteristics of the precipitation, the characteristics including periods of no precipitation, the region where the precipitation occurs, and a season when the precipitation occurs, and wherein the detecting precipitation in the threshold set in the first machine learning model is based solely on the cellular received signal strength data.

12. The computer program product of claim 11, further comprising:
program instructions to, in response to determining the mobile device being outdoor, send the cellular signal data as an input to train the first machine learning model, the cellular signal data including the cellular received signal strength.

13. The computer program product of claim 11, wherein the cellular signal data includes a cellular received signal strength and a cellular tower identification of the mobile device, the cellular received signal strength is collected through test signals sent at predetermined time intervals from a cellular tower identified by the cellular tower identification to the mobile device, and the cellular tower identification is used to detect a height of a transmitting antenna.

14. The computer program product of claim 8, wherein the first machine learning model is configured to use a mixture of machine learning techniques including a decision tree method and a deep learning method.

15. A computer system comprising:
one or more computer processors, one or more computer readable storage media, and program instructions stored on the one or more computer readable storage media for execution by at least one of the one or more computer processors, the program instructions comprising:
program instructions to train a first machine learning model for detecting precipitation in a region using a first training set of data including a plurality of historical data collected from a plurality of mobile devices collected in the region and a plurality of quantitative precipitation estimation data in the region, the first machine learning model being trained by mapping the historical data collected from the plurality of mobile devices to the quantitative precipitation estimation data indicating at least rain start and stop times;
program instructions to train a second machine learning model for detecting a location of a mobile device in the region using a second training set of data including both historical indoor and outdoor data from the plurality of mobile devices collected in the region, the historical indoor and outdoor data including an indoor received signal strength range and location awareness utilized in omitting deviations in a current data received from the mobile device;
program instructions to set, using the second machine learning model, a first threshold to detect the location of the mobile device,
program instructions to receive the current data;
program instructions to determine whether the mobile device is located indoor or outdoor based on the current data by using the first threshold in the second machine learning model, the determining the mobile device is located indoor or outdoor being based on the current data including images from the mobile device;
program instruction to train the first machine learning model with only mobile devices determined to be outside of a building or a car and ignore the historical data collected from the mobile devices determined to be indoor;

program instructions to, in response to determining the mobile device being outdoor, compare the current data against a threshold set in the first machine learning model trained with only the mobile devices determined to be outside to indicate precipitation based solely on received strength data of the current data;

program instructions to determine whether the current data from the mobile device exceeds the threshold; and program instructions to, in response to determining the current data from the mobile device exceeding the threshold, indicate precipitation is detected.

16. The computer system of claim 15, wherein the plurality of historical data from the plurality of mobile devices includes data of temperature, humidity, pressure, location, reports about whether it is raining at the user's location, and photographs from a mobile device camera with a line-of-sight view of a cellular tower.

17. The computer system of claim 15, wherein the plurality of quantitative precipitation estimation data is derived from rain gauges, radar, photographs, anecdotal reports and remote sensing from orbits.

18. The computer system of claim 15, wherein the first machine learning model is trained to map a cellular signal data to characteristics of the precipitation, the characteristics including periods of no precipitation, the region where the precipitation occurs, and a season when the precipitation occurs; and further comprising:

program instructions to, in response to determining the location of the mobile device is rapidly changing, ignore the current data from the mobile device.

19. The computer system of claim 18, further comprising:

program instructions to, in response to determining the mobile device being outdoor, send the cellular signal data as an input to train the first machine learning model, the cellular signal data including at least cellular received signal strength data, wherein the mobile device comprises a cellular telephone and only the historical data collected from the cellular telephone provides the quantitative precipitation estimation data.

20. The computer system of claim 18, wherein the cellular signal data includes cellular received signal strength and a cellular tower identification of the mobile device, the cellular received signal strength is collected through test signals sent at predetermined time intervals from a cellular tower identified by the cellular tower identification to the mobile device, and the cellular tower identification is used to detect a height of a transmitting antenna.

* * * * *